(12) United States Patent
Nochi et al.

(10) Patent No.: US 7,939,038 B2
(45) Date of Patent: May 10, 2011

(54) EXHAUST GAS TREATING APPARATUS AND METHOD

(75) Inventors: Katsumi Nochi, Hiroshima (JP);
Masashi Kiyosawa, Nagasaki (JP);
Shintaro Honjo, Mihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/602,420

(22) PCT Filed: Apr. 30, 2008

(86) PCT No.: PCT/JP2008/058241
§ 371 (c)(1),
(2), (4) Date: Nov. 30, 2009

(87) PCT Pub. No.: WO2009/081600
PCT Pub. Date: Jul. 2, 2009

(65) Prior Publication Data
US 2010/0183493 A1    Jul. 22, 2010

(30) Foreign Application Priority Data

Dec. 26, 2007    (JP) .................................. 2007-333645

(51) Int. Cl.
*B01D 53/56* (2006.01)
*B01D 53/64* (2006.01)
*B01D 53/74* (2006.01)
(52) U.S. Cl. ...................... 423/210; 423/239.1; 422/168; 422/177
(58) Field of Classification Search .................. 423/210, 423/239.1; 422/168, 177
See application file for complete search history.

(56) References Cited

U.S. PATENT DOCUMENTS

| | | | |
|---|---|---|---|
| 4,793,981 | A | 12/1988 | Doyle et al. |
| 2003/0185718 | A1 | 10/2003 | Sellakumar |
| 2007/0202020 | A1 | 8/2007 | Honjo et al. |
| 2008/0138264 | A1 * | 6/2008 | Honjo et al. .................. 423/210 |

FOREIGN PATENT DOCUMENTS

JP    04-005486 B2    1/1992
(Continued)

OTHER PUBLICATIONS

International Search Report of PCT/JP2008/058241. mailing date Jul. 1, 2008.

*Primary Examiner* — Timothy C Vanoy
(74) *Attorney, Agent, or Firm* — Westerman, Hattori, Daniels & Adrian, LLP

(57) ABSTRACT

An exhaust gas treating apparatus removes nitrogen oxides and mercury in exhaust gas from a boiler using an ammonia denitration catalyst, including: an ammonium chloride powder feed unit for feeding ammonium chloride, in powder form, into a vicinity of an entrance of an economizer provided to a combustion gas flue of the boiler and/or an economizer bypass unit, the fed ammonium chloride in powder form being sublimed by a combustion gas, to thereby feed hydrogen chloride and ammonia into the flue; and an ammonium chloride liquid feed unit for feeding ammonium chloride, in liquid form, into a vicinity of the entrance of the economizer and/or the economizer bypass unit, the ammonium chloride liquid feed unit also being capable of feeding ammonium chloride, vaporization of the fed ammonium chloride in liquid form by the combustion gas also allowing hydrogen chloride and ammonia to be fed into the flue.

8 Claims, 4 Drawing Sheets

FOREIGN PATENT DOCUMENTS

| | | |
|---|---|---|
| JP | 10-230137 A | 9/1998 |
| JP | 2000-027626 A | 1/2000 |
| JP | 2000-220437 A | 8/2000 |
| JP | 2001-198434 A | 7/2001 |
| JP | 2002-028450 A | 1/2002 |
| JP | 2002-068734 A | 3/2002 |
| JP | 2005-519732 A | 7/2005 |
| JP | 2007-060729 A | 3/2007 |
| JP | 2007-167743 A | 7/2007 |
| JP | 2007-275838 A | 10/2007 |
| JP | 2007-327377 A | 12/2007 |

* cited by examiner

EXHAUST GAS TREATING APPARATUS AND METHOD

TECHNICAL FIELD

The present invention relates to an exhaust gas treating apparatus and to an exhaust gas treating method.

BACKGROUND ART

FIG. 4 is a schematic diagram of an exhaust gas treating apparatus of a coal-fired boiler. In a coal boiler 10, a combustion gas 11 generates steam in a generating tube inside a furnace 12, as shown in FIG. 4. The generated steam is subjected to gas-liquid separation in a steam drum 13. The steam is introduced into a superheater 14, and converted into superheated steam which is then used for driving a steam turbine. Thereafter, condensed water flows back to a water tube in the furnace 12 and is revaporized. Furthermore, the combustion gas 11 superheats steam in the superheater 14, then heats water to be fed to the coal boiler 10, in an economizer 15, and is exhausted through an exit of the economizer 15 as an exhaust gas 16. The exhaust gas 16 from the economizer 15 is fed to a denitration unit 17. Thereafter, the exhaust gas 16 heats air 19 by heat exchange in an air heater 18, and then is fed into a dust collector 20. Subsequently, the exhaust gas 16 is fed into a desulfurization unit 21 and is then exhausted into the atmosphere as a purified gas 22.

As the denitration unit 17, a denitration unit has been proposed by which reductive denitration is performed by spraying ammonia ($NH_3$), into the exhaust gas 16 from the boiler 10, on the upstream side of the denitration unit (catalyst unit).

Moreover, to remove mercury contained in the exhaust gas, a system has been proposed in which a chlorinating agent such as HCl is sprayed at the upstream of the denitration unit 17, mercury on the catalyst is oxidized (chlorinated), and the mercury is removed by a wet-type desulfurization unit provided on the downstream side (Patent Document 1).
Patent Document 1: Japanese Patent Application Publication No. 10-230137

DISCLOSURE OF THE INVENTION

Problems to be Solved by the Invention

Incidentally, since, in a power plant in which the boiler facility is provided, ammonia and HCl must be stored with great care as hazardous materials, and since HCl is highly corrosive, there is a problem in that the management thereof and anticorrosion measurements thereagainst are very costly.

Moreover, to feed $NH_3$ and HCl into a flue with improved feeding efficiency, a vaporizing unit and a spray grid are necessary for each of $NH_3$ and HCl.

In addition, to vaporize HCl, a high temperature heat source, steam or the like is needed.

In this connection, an exhaust gas treating apparatus which allows a simple storage, and which does not undergo deterioration in removal efficiencies of nitrogen oxides and mercury is strongly desired as a measure for exhaust gas.

In view of the above problems, the present inventors have developed, and provided in Japanese Patent Application Publication No. 2007-060729, an exhaust gas treating apparatus and an exhaust gas treating method using an $NH_4Cl$ powder as those which allow a simple storage, and which do not undergo deterioration in removal efficiencies of nitrogen oxides and mercury, as a measure for exhaust gas.

The present invention makes it possible to deal with an $NH_4Cl$ powder feed line clogging problem, which would otherwise occur in a vicinity of a grinding unit, and to deal with a problem of unstable feed of the powder due to moisture absorption of $NH_4Cl$, this problem being a concern to power plants located in very humid regions. Moreover, the present invention also provides an apparatus capable for more stable feeding of $NH_3$ and HCl by providing measurements for delaying the sublimation time of $NH_4Cl$. Furthermore, the present invention also provides an apparatus in which the $NH_4Cl$ powder is more surely vaporized and the remaining of the powder and the like are thus prevented.

Means for Solving the Problems

The present invention has been made in view of the above problems and provides an exhaust gas treating apparatus for removing nitrogen oxides and mercury in an exhaust gas from a boiler by use of an ammonia denitration catalyst, the exhaust gas treating apparatus characterized by including:

an ammonium chloride powder feed unit for feeding ammonium chloride, in powder form, into any one of or both of a vicinity of an entrance of an economizer provided to a combustion gas flue of the boiler and an economizer bypass unit, the fed ammonium chloride in powder form being sublimed by a combustion gas, to thereby feed hydrogen chloride and ammonia into the flue; and an ammonium chloride liquid feed unit for feeding ammonium chloride, in liquid form, into any one of or both of a vicinity of the entrance of the economizer and the economizer bypass unit, the ammonium chloride liquid feed unit also being capable of feeding ammonium chloride, vaporization of the fed ammonium chloride in liquid form by the combustion gas also allowing hydrogen chloride and ammonia to be fed into the flue.

In an embodiment of the exhaust gas treating apparatus according to the present invention, a particle diameter of the ammonium chloride in powder form may be 0.25 mm or less.

The embodiment of the exhaust gas treating apparatus according to the present invention can include any one of or both of an HCl feed unit and an $NH_3$ feed unit provided downstream of the economizer.

In the embodiment of the exhaust gas treating apparatus according to the present invention, the ammonium chloride powder feed unit can include a grinding unit for solid ammonium chloride.

The embodiment of the exhaust gas treating apparatus according to the present invention can include a vaporizing unit for heating and vaporizing the ammonium chloride in powder form fed by the ammonium chloride powder feed unit.

Another embodiment of the exhaust gas treating apparatus according to the present invention is characterized in that at least one vaporization plate which forms an inclined angle with respect to a flow direction of the combustion gas is provided in the economizer bypass unit.

Still another embodiment of the exhaust gas treating apparatus according to the present invention is characterized in that a sublimation tray for receiving the ammonium chloride in powder form or in liquid form is provided in the economizer bypass.

The present invention provides, as a different aspect thereof, an exhaust gas treating method for removing nitrogen oxides and mercury in an exhaust gas from a boiler by use of an ammonia denitration catalyst, the exhaust gas treating method characterized by including the steps of: feeding ammonium chloride in liquid form into any one of or both of a vicinity of an entrance of an economizer provided to a combustion gas flue of a boiler facility and an economizer bypass unit; and vaporizing the ammonium chloride at a temperature of a combustion gas atmosphere at a place of the feed, to thereby feed hydrogen chloride and ammonia into the flue.

EFFECTS OF THE INVENTION

According to the present invention, ammonium chloride ($NH_4Cl$) is introduced, in powder form, into an economizer of a boiler facility or a bypass unit thereof through both of which a high temperature combustion gas passes, and vaporization into HCl and $NH_3$ is achieved by the high temperature combustion gas (550 to 650° C.). This makes it possible to eliminate the conventional vaporizing unit and spray grid, and storage tanks for storing HCl and $NH_3$ in their liquid forms.

In addition to such an effect, since an ammonium chloride liquid feed unit for feeding ammonium chloride in liquid form is also provided, it is possible to stably feed ammonium chloride in liquid form even when an $NH_4Cl$ powder feed line is clogged possibly occurring in a vicinity of the grinding unit. Moreover, even when the $NH_4Cl$ powder cannot be fed because of moisture absorption thereof, in a power plant located in a highly humid region, it is possible to stably feed ammonium chloride in liquid form. In other words, this makes it possible to deal with the problem in stable feeding.

Moreover, according to an embodiment in which vaporization plates are provided to an economizer bypass unit, measures to delay the sublimation time of $NH_4Cl$ can also be provided, thereby making it possible to more stably feed $NH_3$ and HCl.

Furthermore, according to an embodiment in which a sublimation tray is provided, the $NH_4Cl$ powder can be more reliably vaporized, preventing the remaining of the powder and the like.

Figure 1:
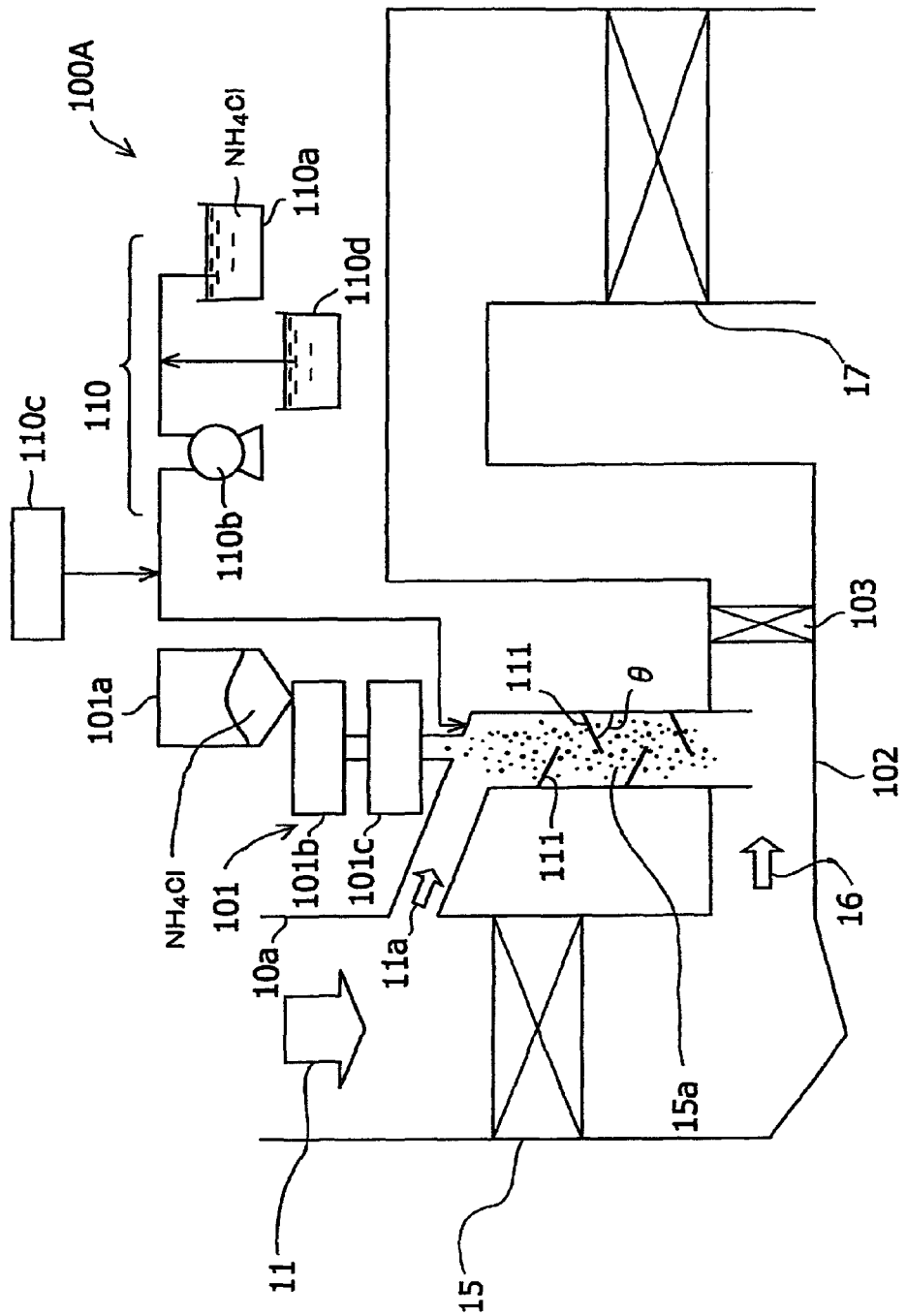
FIG. 1 is a schematic diagram of an embodiment of an exhaust gas treating apparatus according to the present invention.

| EXPLANATION OF REFERENCE NUMERALS | |
|---|---|
| 10 | Coal boiler |
| 11,11a | Combustion gas |
| 12 | Furnace |
| 13 | Steam drum |
| 14 | Superheater |
| 15 | Economizer |
| 15a | Economizer bypass unit |
| 16 | Exhaust gas |
| 17 | Denitration unit |
| 18 | Air heater |
| 19 | Air |
| 20 | Dust collector |
| 21 | Desulfurization unit |
| 22 | Purified gas |

| EXPLANATION OF REFERENCE NUMERALS | |
|---|---|
| 100A, 100B | Exhaust gas treating apparatus |
| 101 | Ammonium chloride powder feed unit |
| 102 | Exhaust gas flue |
| 103 | Mixer |
| 104 | Switching part |
| 110 | Ammonium chloride liquid feed unit |
| 110a | Tank |
| 110b | Feed pump |
| 110c | Dilution air feed unit |
| 110d | Wash water feed unit |
| 111 | Vaporization plate |
| 112 | Bypass gas communicating passage |

BEST MODES FOR CARRYING OUT THE INVENTION

Hereinafter, the present invention will be described in detail with reference to the drawings. Note that the present invention is not limited to the following embodiments. Constituent elements in the following embodiments also include those which are easily conceivable by a person skilled in the art and those which are substantially equivalent.

Figure 3:
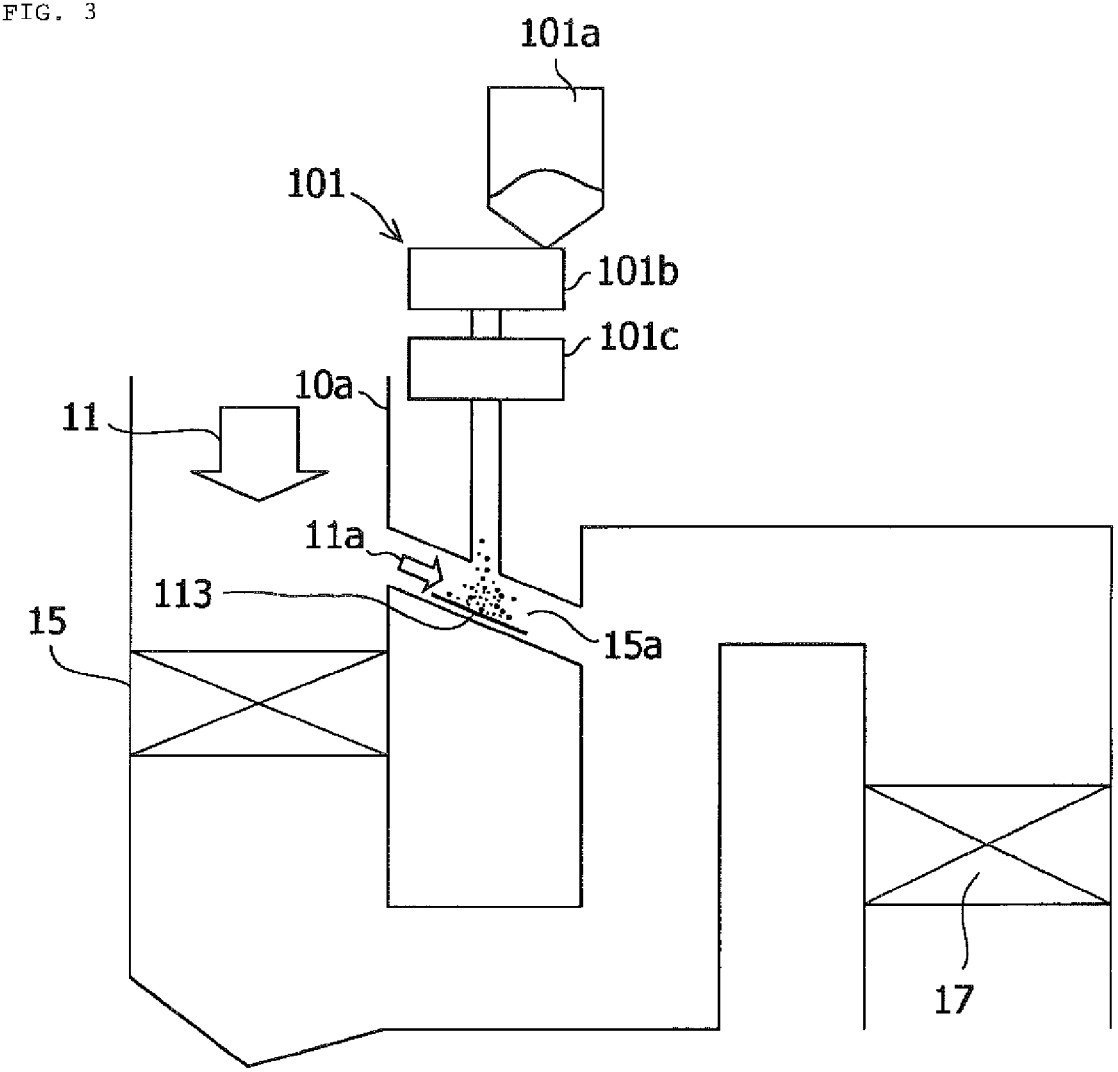
FIG. 3 is a schematic diagram of still another embodiment of the exhaust gas treating apparatus according to the present invention.

An exhaust gas treating apparatus according to an embodiment of the present invention will be described with reference to the drawings. FIG. 1 is a conceptual diagram showing an exhaust gas treating apparatus according to Examples. Note that a boiler system of the present invention is the same as the boiler system in FIG. 3 and FIG. 1 shows the boiler system only from a boiler part to a denitration unit part. In addition, the same members are denoted by the same reference numerals, and description thereof is omitted.

Figure 4:
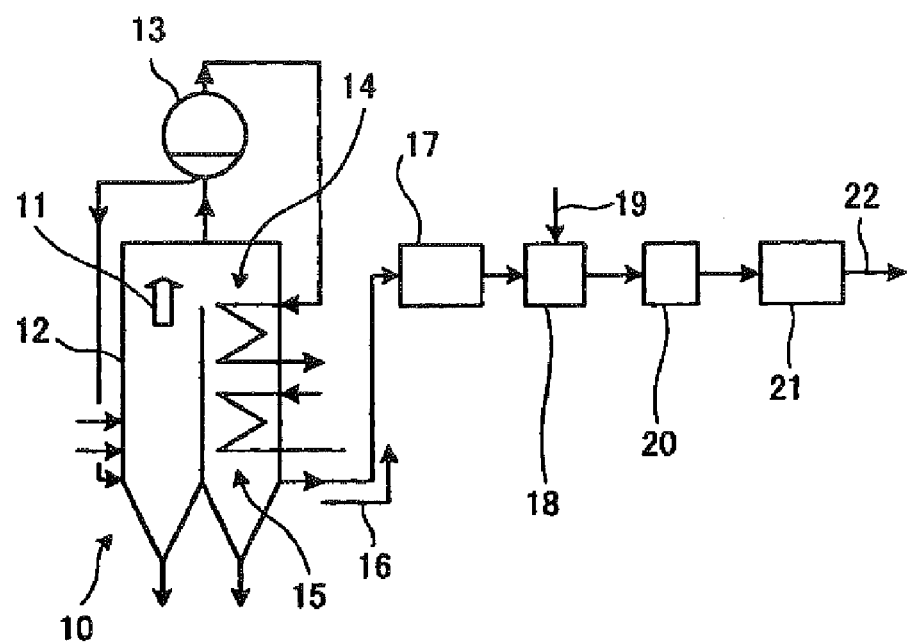
FIG. 4 is a schematic diagram of an exhaust gas treating apparatus of a coal-fired boiler.

As shown in FIG. 1, an exhaust gas treating apparatus 100A according to this embodiment is an exhaust gas treating apparatus for removing nitrogen oxides and mercury in an exhaust gas 16 exhausted from the boiler, by use of an ammonia denitration catalyst. Note that, in the description and the claims, the phrase "removing mercury by use of an ammonia denitration catalyst" means a series of steps in which mercury is oxidized to mercury oxide with hydrogen chloride by use of a denitration catalyst, and this mercury oxide is removed by, for example, the dust collector 20 or the desulfurization unit 21 in FIG. 4.

A gas flue 10a for the combustion gas 11 of the boiler (not illustrated) is provided with the economizer 15. In this embodiment, an economizer bypass unit 15a is provided which allows the high temperature combustion gas 11 to bypass the economizer 15 and to reach a downstream side.

In this embodiment, an ammonium chloride powder feed unit 101 for feeding ammonium chloride ($NH_4Cl$) in powder form is provided. Moreover, in this embodiment, an ammonium chloride liquid feed unit 110 for feeding ammonium chloride in liquid form is also provided separately.

In this embodiment, with a configuration including the ammonium chloride powder feed unit 101 as described above, $NH_4Cl$ is sprayed in powder form into the economizer bypass unit 15a, sublimed by a high temperature combustion gas 11a (550 to 650° C.) passing therethrough, and fed, as HCl and $NH_3$, into the flue 102 for the exhaust gas 16 communicating with the bypass unit.

Meanwhile, in the economizer bypass unit 15a of this embodiment, the economizer bypass unit 15a is provided with multiple vaporization plates 111 each of which forms an inclined angles θ with respect to the flow direction of the combustion gas. The inclined angle θ is an angle which is formed by an axis of the vaporization plate (rectangular) 111 in the longitudinal direction thereof with respect to the flow direction of the combustion gas, where the flow direction is the longitudinal direction of the economizer bypass unit 15a. Preferably, the vaporization plates 111 are arranged in a way that, when viewed from the above of the economizer bypass unit 15a, a bottom part cannot be seen because of the vaporization plates 111 which obstruct the view.

The presence of the vaporization plates 111 also provides measures to delay the sublimation time of $NH_4Cl$, making it possible to more stably feed $NH_3$ and HCl.

Note that the reference numeral 103 denotes a mixer for mixing the hydrogen chloride (HCl) and the ammonia ($NH_3$) which have been fed into the exhaust gas 16 at the flue 102 as described above.

Meanwhile, the nitrogen oxide concentration in boiler equipment may fluctuate. In such a case, the feed amount of ammonia may be increased by spraying urea $((H_2N)_2C=O)$ with ammonium chloride.

In this embodiment, the feed unit 101 for feeding the ammonium chloride ($NH_4Cl$) into the economizer bypass unit 15a includes: a silo 101a for temporarily storing the ammonium chloride in powder form; a feeder 101b for feeding the stored ammonium chloride into the grinding unit (to be described later) side by a predetermined amount at a time; and a grinding unit 101c for grinding the fed ammonium chloride to a predetermined particle diameter.

Since the sublimation reaction of $NH_4Cl$ is endothermic, a higher temperature is preferable. For this reason, in this embodiment, the $NH_4Cl$ powder is atomized by the grinding unit 101c connected to the feeder 101b in feeding the $NH_4Cl$ powder by the feeder 101b from the silo 101a. This makes the $NH_4Cl$ more easily sublime. Note that the feed amount may be regulated by the feeder 101b, and the feed amount may be controlled on the basis of an exit NOx monitor or an exit Hg monitor. Also note that, when the ammonium chloride in powder form has a certain particle diameter or less, provision of the grinding unit 101c is unnecessary.

Here, the certain particle diameter of the ammonium chloride needs to be determined on the basis of the flow rate of the combustion gas 11, since the certain particle diameter has a relationship with the gas flow rate. For example, when the residence time of the combustion gas 11a passing through the economizer bypass unit 15a is 5 seconds or less, the particle diameter of the ammonium chloride may be, for example, 0.25 mm or less, and preferably 0.2 mm or less.

Here, the $NH_3$ obtained by decomposition of the ammonium chloride is used in the denitration unit 17 for reductive denitration of NOx, and the HCl is used for mercury oxidation, to thereby remove nitrogen oxides and mercury from the exhaust gas. Note that, it is conceivable that ammonium chloride is introduced on a boiler side with a higher temperature. However, $NH_3$ may decompose at or above 651° C., which is the spontaneous ignition temperature of $NH_3$. Hence, the temperature needs to be 650° C. or below.

The concentration of $NH_3$ and HCl in the exhaust gas 16 at the flue 102 may be set such that the $NH_3$/NOx molar ratio of this concentration to the NOx concentration of the boiler exhaust gas 16 takes a value of 1 or less in accordance with the required denitration performance. The spraying is performed so that the concentration of $NH_3$ and HCl may be several tens of ppm to several hundreds of ppm, and preferably several tens of ppm to 200 ppm.

Because the combustion gas 11 passing through the economizer bypass unit 15a normally accounts for approximately several percent of the whole combustion gas 11, the concentration of $NH_3$ and HCl in the economizer bypass unit 15a is preferably set to approximately 0.1 to several percent. This is because too great an amount increases the cost, thereby decreasing the cost efficiency. Note that the Hg concentration in a boiler combustion exhaust gas is preferably 0.1 to several tens of $\mu g/m^3 N$, i.e., the molar ratio to the HCl concentration in the exhaust gas is preferably $\frac{1}{1000}$ or less.

As described above, ammonium chloride ($NH_4Cl$) is introduced in powder form into the economizer bypass unit 15a, through which the high temperature combustion gas 11 on the upstream side of the denitration unit 17 including the ammonia denitration catalyst passes, of the boiler facility. Thereby, the high temperature combustion gas 11 (550 to 650° C.) passing through the economizer bypass unit 15a vaporizes the ammonium chloride ($NH_4Cl$) into HCl and $NH_3$. As a result, it is possible to eliminate the conventional vaporizing unit and spray grid, and storage tanks for storing HCl and $NH_3$ in their liquid forms As described above, the present invention makes it possible to eliminate HCl and $NH_3$ vaporizing units, a spray grid, storage tanks and the like. In addition thereto, the ammonium chloride ($NH_4Cl$) powder, which is a neutral salt and which is easy to handle, makes it possible to significantly reduce facility costs which would otherwise be incurred for permission and authorization related to regulations and for safety management measures of HCl and $NH_3$, both of which are hazardous materials.

Moreover, the combustion gas 11a passing through the economizer bypass unit 15a is used as the heat source for the sublimation. This eliminates the need for a separate heat source, and also eliminates the need for a separate sublimation facility, because the sublimation rate is high and the required residence time can be shortened because of the high temperature (550° C.) relative to a denitration catalyst temperature (350 to 420° C.) in the vicinity of the upstream of a conventional denitration catalyst unit.

Moreover, if necessary, the ammonium chloride powder is ground by using the grinding unit 101c, to thereby increase the sublimation rate. Hence, it is possible to prevent ammonium chloride that has not yet sublimated from remaining or accumulating.

The cost of the agent in a case in which only ammonium chloride is fed is lower than that in a case in which HCl and $NH_3$ are separately fed as in a conventional case. Accordingly, the running cost can be reduced for a long period of time.

Moreover, as described above, the separate ammonium chloride liquid feed unit 110 for feeding ammonium chloride in liquid form is also provided in this embodiment. This ammonium chloride liquid feed unit 110 includes a tank 110a, a feed pump 110b, a dilution air feed unit 110c, and a wash water feed unit 110d.

In this embodiment, by operation of the feed pump 110b, the ammonium chloride liquid is fed into the economizer bypass unit 15a. The ammonium chloride liquid is vaporized by the combustion gas 11, converted into hydrogen chloride and ammonia, and fed into the flue 102.

Air for dilution is fed from the dilution air feed unit 110c. Thereby, the ammonium chloride liquid is sprayed into the economizer bypass unit 15a in a highly dispersed manner.

The wash water feed unit 110d is capable of feeding wash water for purging. This makes it possible to purge the ammonium chloride liquid feed unit 110. If the ammonium chloride liquid remains in the feed unit 110 when the plant is stopped, clogging may be caused by deposition of the ammonium chloride. This can be prevented by purging with the wash water.

This ammonium chloride liquid feed unit 110 constitutes a characteristic part of the present invention.

For example, there is a concern that, around from the silo 101a to the grinding unit 101c, a feed line for the $NH_4Cl$ powder may clog. Even when such a situation occurs, it is possible to stably feed ammonium chloride in liquid form from the ammonium chloride liquid feed unit 110. Moreover, even when moisture absorption of $NH_4Cl$ makes it impossible to feed the powder in a power plant located in a highly humid region, ammonium chloride can be stably fed in liquid form. Specifically, the stable feed problem can be dealt with. As precautions against the clogging due to moisture absorption of $NH_4Cl$, it is preferable to circulate dry air or a dehumidified exhaust gas through the $NH_4Cl$ feed unit 101.

Figure 2:
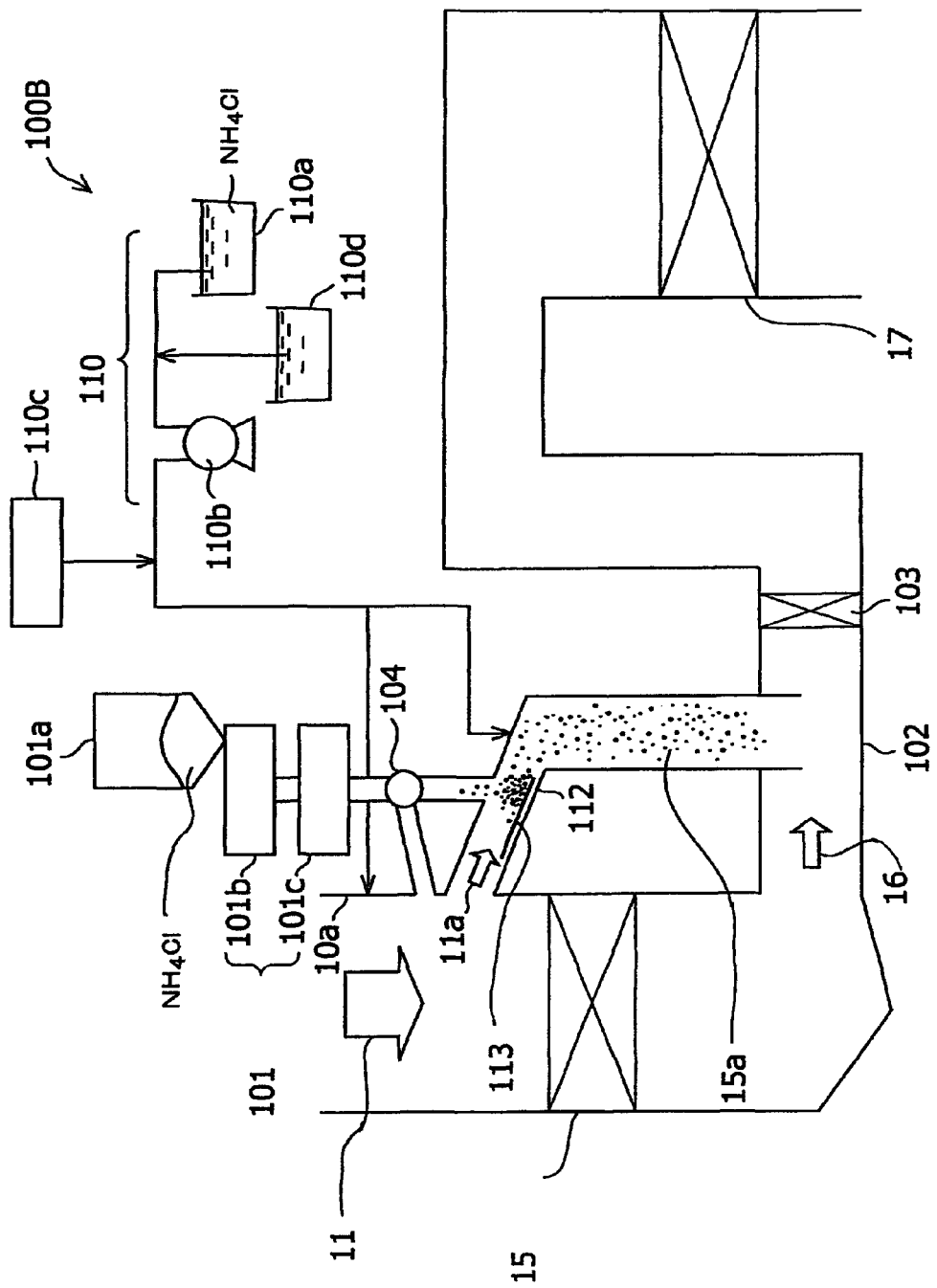
FIG. 2 is a schematic diagram of another embodiment of the exhaust gas treating apparatus according to the present invention.

FIG. 2 shows another embodiment of the exhaust gas treating apparatus according to the present invention.

In an exhaust gas treating apparatus 100B according to this embodiment, ammonium chloride in powder form can be fed also into the vicinity of the entrance of the economizer 11. Note that the same members as in the exhaust gas treating apparatus in FIG. 1 are denoted by the same reference numerals, and description thereof will be omitted.

In this embodiment, a switching part 104 is provided. This switching part 104 can be set as appropriate to feed the ammonium chloride in powder form into any one of or both of the vicinity of the entrance of the economizer 15 and the economizer bypass unit 15a. Moreover, the ammonium chloride in liquid form can also be fed into any one of or both of the vicinity of the entrance of the economizer 15 and the economizer bypass unit 15a from the ammonium chloride liquid feed unit 110 by switching a valve, which is not shown.

Note that, when the ammonium chloride in powder form is fed into the vicinity of the entrance of the economizer 11 and when the residence time of the combustion gas 11 passing through the economizer 15 is 2 seconds or less, it is preferable that the particle diameter of ammonium chloride be, for example, 0.15 mm or less, and preferably 0.1 mm or less. When fine ammonium chloride particles are needed, a grinding unit having a classification mechanism is provided, or a classifier is provided downstream of a grinding unit and a collector is provided downstream of the classifier. To improve accuracy in the feed amount regulation, a silo/hopper is provided downstream of the collector, and a constant feeder is used.

Moreover, this embodiment is designed to feed ammonium chloride powder into a bypass gas communicating passage 112 for the combustion gas 11 extending from the vicinity of the entrance of the economizer 11 to the economizer bypass unit 15a. Moreover, as shown in the drawing, the bypass gas communicating passage 112 is provided with a sublimation tray 113 for receiving the ammonium chloride powder to be fed.

This sublimation tray 113 has a tray-like shape which extends along a wall surface of the bypass gas communicating passage 112, so that the sublimation tray 113 has a configuration with a shape which allows reception of ammonium chloride powder falling from the above. Moreover, a gap for the gas flow is secured between the bottom part of the sublimation tray 113 and the bypass gas communicating passage 112.

With such a configuration, even when the ammonium chloride powder is stacked on the sublimation tray 113, the stacked ammonium chloride powder is prevented from remaining in such a way that the stacked ammonium chloride powder is heated by the combustion gas 11 flowing through the gap, and it is thereby reliably sublimed.

FIG. 3 shows still another embodiment of the exhaust gas treating apparatus according to the present invention.

This embodiment is a case in which the ammonium chloride liquid feed unit 110 is not provided, and has a configuration in which the economizer bypass unit 15a extends only in a horizontal direction. Note that substantially the same members as in the exhaust gas treating apparatuses in FIGS. 1 and 2 are denoted by the same reference numerals, and description thereof will be omitted.

With this configuration, the residence time of falling ammonium chloride particles is extremely short.

Accordingly, the effect obtained by providing the sublimation tray 113 for receiving the fed ammonium chloride powder is great. In other words, the stacked ammonium chloride powder is heated and is reliably sublimed, whereby the stacked ammonium chloride powder is reliably prevented from remaining.

Note that, in this embodiment, the sublimation tray 113 has a tray-like shape which extends along a wall surface of the economizer bypass unit 15a, so that the sublimation tray 113 has a configuration with a shape which allows reception of ammonium chloride powder falling from the above. Moreover, a gap for the gas flow is secured between the bottom part of the sublimation tray 113 and the economizer bypass unit 15a.

Besides the above-described embodiments, in the exhaust gas treating apparatus according to the present invention, an HCl feed unit and an $NH_3$ feed unit for respectively feeding HCl and $NH_3$ into the flue 102 for the exhaust gas 16 itself can be provided. When the balance of the concentrations of nitrogen oxides and mercury in an exhaust gas exhausted from a combustion facility such as a boiler is different from a normal one, these feed units make it possible to take countermeasures thereagainst by feeding a necessary amount of hydrochloric acid or ammonium into the exhaust gas flue 102. For example, when a necessary $NH_3$ amount is larger than a necessary HCl amount, spraying HCl from the HCl feed unit and spraying ammonium chloride may be conducted. Meanwhile, when a necessary $NH_3$ amount is smaller than a necessary HCl amount, spraying $NH_3$ from the $NH_3$ feed unit and spraying ammonium chloride may be conducted. In such a case, urea $((H_2N)_2C=O)$ may be sprayed instead of feeding ammonia. This makes it possible to take appropriate countermeasures, even when the concentration of nitrogen oxides or mercury in the exhaust gas 16 may fluctuate.

Note that for a configuration which is the same as in FIG. 1, except that the constituent element, ammonium chloride liquid feed unit 110 is not provided, may include the vaporization plates 111.

Moreover, the sublimation tray may be used for receiving the ammonium chloride in liquid form.

EXAMPLES

Test Examples 1 to 4

The exhaust gas purification apparatus 100A in FIG. 1 was used for conducting tests as below.

The gas amount of the combustion gas 11 from the boiler furnace was 2.4 million $Nm^3/h$. The temperature of the combustion gas 11 at the economizer entrance was 600° C. Through the bypass unit 15a, 24000 $Nm^3/h$, which was 1% of the combustion gas 11, was bypassed.

Test Example 1

First, in Test Example 1, the NOx concentration at the entrance of the denitration unit (SCR) 17 was 167 ppm, and the mercury concentration ($Hg^0$) thereat was 8 ppm.

Ammonium chloride was fed in powder form at 500 kg/h and in liquid form at 375 kg/h (in terms of ammonium chloride, in a 27% by weight aqueous solution). The $NH_3$ feed concentration at the entrance of the denitration unit (SCR) 17 was 150 ppm, and the HCl feed concentration at the entrance of the denitration unit (SCR) 17 was 150 ppm. The denitration ratio was 90%, and the mercury oxidation ratio was 97%. Table 1 shows the results.

TABLE 1

|  |  | Example 1 | Example 2 | Example 3 | Example 4 |
|---|---|---|---|---|---|
| Amount of exhaust gas | $m^3N/h$ | 2400000 | 2400000 | 2400000 | 2400000 |
| Exhaust gas temperature at ECO entrance | °C. | 600 | 600 | 600 | 600 |
| Amount of ECO bypass gas | $m^3N/h$ | 24000 | 24000 | 24000 | 24000 |
| Amount of ammonium chloride fed | kg/h | 500 | 500 | 500 | 300 |
| Ammonium chloride aqueous solution (saturated, 27% by weight) | kg/h | 375 | 375 | 375 | 120 |
| Amount of $NH_3$ fed | kg/h | 0 | 300 | 0 | 0 |
| Amount of urea fed | kg/h | 0 | 0 | 530 | 0 |
| Amount of HCl fed | kg/h | 0 | 0 | 0 | 304 |
| $NH_3$ concentration at SCR entrance | ppm | 150 | 315 | 315 | 72 |
| HCl concentration at SCR entrance | ppm | 150 | 150 | 150 | 150 |
| NOx concentration at SCR entrance | ppm | 167 | 350 | 350 | 80 |
| $NH_3/NOx$ ratio | — | 0.9 | 0.9 | 0.9 | 0.9 |
| Temperature at SCR entrance | °C. | 370 | 370 | 370 | 370 |
| $Hg^0$ concentration at SCR entrance | $\mu g/m^3N$ | 8 | 8 | 8 | 8 |
| $Hg^{2+}$ concentration at SCR entrance | $\mu g/m^3N$ | 2 | 2 | 2 | 2 |
| $Hg^0$ concentration at SCR exit | $\mu g/m^3N$ | 0.24 | 0.4 | 0.4 | 0.16 |
| $Hg^{2+}$ concentration at SCR exit | $\mu g/m^3N$ | 9.76 | 9.6 | 9.6 | 9.84 |
| $Hg^0$ oxidation ratio | % | 97 | 95 | 95 | 98 |
| Denitration ratio | % | 90 | 90 | 90 | 90 |

Test Example 2

Here, in Test Example 2, the NOx concentration at the entrance of the denitration unit (SCR) 17 was increased to 350 ppm. Incidentally, the mercury concentration ($Hg^0$) was the same and was 8 ppm.

Ammonium chloride was fed in powder form at 500 kg/h and in liquid form at 375 kg/h, and also ammonia was fed into the flue 102 at 319 kg/h. As a result, the $NH_3$ feed concentration at the entrance of the denitration unit (SCR) 17 was 315 ppm, and the HCl feed concentration at the entrance of the denitration unit (SCR) 17 was 150 ppm. The denitration ratio was 90%, and the mercury oxidation ratio was 95%.

In Test Example 2, the mercury oxidation ratio is slightly reduced because of the large $NH_3$ concentration for use in decreasing the nitrogen oxides.

Test Example 3

Here, in Test Example 3, the NOx concentration at the entrance of the denitration unit (SCR) 17 was increased to 350 ppm. Incidentally, the mercury concentration ($Hg^0$) was the same and was 8 ppm.

Ammonium chloride was fed in powder form at 500 kg/h and in liquid form at 375 kg/h, and also urea was feed into the flue 102 at 530 kg/h. As a result, the $NH_3$ feed concentration at the entrance of the denitration unit (SCR) 17 was 315 ppm, and the HCl feed concentration at the entrance of the denitration unit (SCR) 17 was 150 ppm. The denitration ratio was 90%, and the mercury oxidation ratio was 95%.

Decrease in denitration ratio was not observed even by feeding urea instead of separately feeding ammonia. Note that, also in Test Example 3, the mercury oxidation ratio is slightly reduced because of the large $NH_3$ concentration for use in decreasing the nitrogen oxides.

Test Example 4

Here, in Test Example 4, the NOx concentration at the entrance of the denitration unit (SCR) 17 was reduced to 80 ppm. Incidentally, the mercury concentration ($Hg^0$) was the same and was 8 ppm.

Ammonium chloride was fed in powder form at 300 kg/h and in liquid form at 120 kg/h. As a result, the $NH_3$ feed concentration at the entrance of the denitration unit (SCR) 17 was 72 ppm, and the HCl feed concentration at the entrance of the denitration unit (SCR) 17 was 72 ppm. The denitration ratio was 90%, and the mercury oxidation ratio was 98%. In Test Example 4, the mercury oxidation ratio was improved because of the low $NH_3$ concentration for use in decreasing nitrogen oxides.

INDUSTRIAL APPLICABILITY

As described above, according to the present invention, ammonium chloride ($NH_4Cl$) is introduced in powder form, and is vaporized into HCl and $NH_3$ by a high temperature combustion gas (550 to 650° C.) passing through the economizer or the economizer bypass unit thereof, making it possible to simplify exhaust gas treating equipment. Moreover, the capability of feeding ammonium chloride ($NH_4Cl$) also in liquid form allows ammonium chloride to be stably fed.

The invention claimed is:

1. An exhaust gas treating apparatus for removing nitrogen oxides and mercury in an exhaust gas from a boiler by use of an ammonia denitration catalyst, the exhaust gas treating apparatus comprising:
    an ammonium chloride powder feed unit for feeding ammonium chloride, in powder form, into any one of or both of a vicinity of an entrance of an economizer provided to a combustion gas flue of the boiler and an economizer bypass unit, the fed ammonium chloride in powder form being sublimed by a combustion gas, to thereby feed hydrogen chloride and ammonia into the flue; and
    an ammonium chloride liquid feed unit for feeding ammonium chloride, in liquid form, into any one of or both of a vicinity of the entrance of the economizer and the economizer bypass unit, the ammonium chloride liquid feed unit also being capable of feeding ammonium chloride, vaporization of the fed ammonium chloride in liquid form by the combustion gas also allowing hydrogen chloride and ammonia to be fed into the flue.

2. The exhaust gas treating apparatus according to claim 1, wherein a particle diameter of the ammonium chloride in powder form is 0.25 mm or less.

3. The exhaust gas treating apparatus according to claim 1, comprising any one of or both of an HCl feed unit and an $NH_3$ feed unit provided downstream of the economizer.

4. The exhaust gas treating apparatus according to claim 1, wherein the ammonium chloride powder feed unit includes a grinding unit for solid ammonium chloride.

5. The exhaust gas treating apparatus according to claim 1, comprising a vaporizing unit for heating and vaporizing the ammonium chloride in powder form fed by the ammonium chloride powder feed unit.

6. The exhaust gas treating apparatus according to claim 1, wherein at least one vaporization plate which forms an inclined angle with respect to a flow direction of the combustion gas is provided in the economizer bypass.

7. The exhaust gas treating apparatus according to claim 1, wherein a sublimation tray for receiving the ammonium chloride in powder form or in liquid form is provided in the economizer bypass.

8. An exhaust gas treating method for removing nitrogen oxides and mercury in an exhaust gas from a boiler by use of an ammonia denitration catalyst, the exhaust gas treating method comprising the steps of:
    feeding ammonium chloride in liquid form into any one of or both of a vicinity of an entrance of an economizer provided to a combustion gas flue of a boiler facility and an economizer bypass unit; and
    vaporizing the ammonium chloride at a temperature of a combustion gas atmosphere at a place of the feed, to thereby feed hydrogen chloride and ammonia into the flue.

* * * * *